Patented Dec. 22, 1942

2,306,325

UNITED STATES PATENT OFFICE 2,306,325

OIL FILTER

Philip Sidney Allam, Little Chesterford, near Saffron Walden, England, assignor to Simmonds Development Corporation Limited, London, England No Drawing. Application April 29, 1941, Serial No. 390,998. In Great Britain May 29, 1940

6 Claims. (Cl. 196—16)

This invention relates to oil filters of the kind comprising a mass of porous material through which the oil is passed, and more particularly though not exclusively to filters for filtering lubricating oils used in the lubrication of internal combustion engines.

The invention has for its object the provision of a filtering material that not only serves to remove particles suspended in the oil but also to neutralize undesired acidity of the oil.

The filtering material in accordance with the present invention comprises a porous filtering medium having intimately admixed therewith a salt of an amino acid having at least one amino-substituted hydroxyalkyl group.

As the porous filtering medium there is employed a material which will permit percolation therethrough of the oil to be purified but which will serve to retain any particles colloidally or otherwise suspended in the oil. An example of a suitable porous filtering medium is cotton waste. The amino compound employed is preferably substantially immiscible with the oil to be filtered and should be substantially stable and non-volatile at the temperature of filtration. The amino compound may advantageously be an alkali metal or alkaline earth metal salt of a substituted glycocoll of the general formula

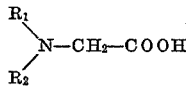

where $R^1$ is hydroxyalkyl and $R^2$ is hydrogen, alkyl or hydroxyalkyl. Examples of such compounds are the sodium salts of N. mono- and di-hydroxyethylglycocoll.

The amino compound is intimately admixed with the cotton waste or other porous filtering medium. For example, the amino compound may be dissolved in a suitable solvent and the porous filtering medium impregnated with the solution, the solvent, if desired, being subsequently removed.

In use, the filtering material is housed within a suitable container which is connected to the oil flow line. To facilitate replacement of the filtering material when required, it is preferably housed in a suitable casing to form a cartridge adapted to be readily inserted in and removed from the container.

The amino compounds employed in accordance with this invention combine directly with acid present or formed in the oil without the liberation of water. They also assist considerably in the retention by the cotton waste or other porous filtering medium employed of finely divided and colloidally suspended particles present in the oil.

The esters of the substituted amino acids may be employed in accordance with this invention instead of the salts thereof, and the expression "salt of an amino acid" is used in the following claims to include the esters of such acids.

I claim:

1. An oil filter comprising a porous filtering medium having intimately admixed therewith a salt of an amino acid having at least one amino-substituted hydroxyalkyl group.

2. An oil filter comprising a porous filtering medium having intimately admixed therewith a salt of a substituted glycocoll of the general formula

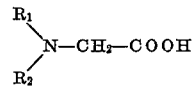

where $R^1$ is hydroxyalkyl and $R^2$ is hydrogen, alkyl or hydroxyalkyl.

3. An oil filter comprising cotton waste having intimately admixed therewith a salt of a substituted glycocoll of the general formula

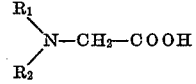

where $R^1$ is hydroxyalkyl and $R^2$ is hydrogen, alkyl or hydroxyalkyl.

4. An oil filter according to claim 3, wherein the cotton waste is admixed with the sodium salt of N. monohydroxyethylglycoll.

5. An oil filter according to claim 3, wherein the cotton waste is admixed with the sodium salt of N. dihydroxyethylglycocoll.

6. For use in an oil filter, a cartridge adapted to be readily inserted in and removed from a container, said cartridge containing a mass of porous filtering medium having intimately admixed therewith a salt of an amino acid having at least one amino-substituted hydroxyalkyl group.

PHILIP SIDNEY ALLAM.